(12) United States Patent
Houston et al.

(10) Patent No.: US 7,925,670 B2
(45) Date of Patent: *Apr. 12, 2011

(54) USE OF AGENTS AND CONTROL DOCUMENTS TO UPDATE A DATABASE STRUCTURE

(75) Inventors: William M. Houston, Colchester, VT (US); James A. Martin, Jr., Endicott, NY (US); Eric J. Morin, South Burlington, VT (US)

(73) Assignee: International Business Machines Corporation, Armonk, NY (US)

( * ) Notice: Subject to any disclaimer, the term of this patent is extended or adjusted under 35 U.S.C. 154(b) by 370 days.

This patent is subject to a terminal disclaimer.

(21) Appl. No.: 12/118,012

(22) Filed: May 9, 2008

(65) Prior Publication Data

US 2008/0222175 A1    Sep. 11, 2008

Related U.S. Application Data

(60) Continuation of application No. 11/248,098, filed on Oct. 12, 2005, now Pat. No. 7,395,272, which is a division of application No. 09/965,146, filed on Sep. 27, 2001, now Pat. No. 6,988,105.

(51) Int. Cl.
*G06F 7/00* (2006.01)
*G06F 17/30* (2006.01)

(52) U.S. Cl. ......... 707/793; 707/802; 707/805; 707/807

(58) Field of Classification Search .................. 707/793
See application file for complete search history.

(56) References Cited

U.S. PATENT DOCUMENTS

| | | | |
|---|---|---|---|
| 4,677,588 A * | 6/1987 | Benjamin et al. | 709/228 |
| 5,548,506 A * | 8/1996 | Srinivasan | 705/8 |
| 5,855,014 A | 12/1998 | Smith | |
| 6,000,000 A | 12/1999 | Hawkins et al. | |
| 6,026,413 A | 2/2000 | Challenger et al. | |
| 6,192,364 B1 | 2/2001 | Baclawski | |
| 6,240,414 B1 * | 5/2001 | Beizer et al. | 1/1 |
| 6,314,089 B1 * | 11/2001 | Szlam et al. | 370/270 |
| 6,381,579 B1 | 4/2002 | Gervais et al. | |
| 6,625,648 B1 * | 9/2003 | Schwaller et al. | 709/224 |
| 6,718,330 B1 * | 4/2004 | Zenner | 707/694 |
| 6,988,105 B2 | 1/2006 | Houston et al. | |

* cited by examiner

*Primary Examiner* — Hung T Vy
*Assistant Examiner* — Binh V Ho
(74) *Attorney, Agent, or Firm* — Schmeiser, Olsen & Watts; William E. Schiesser

(57) ABSTRACT

A method and system for updating a database structure. The database structure includes a dynamically changing list of control documents. A control document specifies tasks to be performed on the database structure. An agent finds an approved control document on the list such as by looking into a view of control documents. Processing the approved control document includes causing an execution of at least one task on the approved control document. Execution of a such task includes updating of the database structure, and may be implemented by the agent that found the control document or by another agent called by the agent.

19 Claims, 5 Drawing Sheets

| Status | Type | Submitter | Submitted On |
|---|---|---|---|
| | | | |
| Approved | | | |
| | Replace Brep - All Departments | | |
| | | Jack S. Blue | 08/05/2001 01:33:41PM |
| | Replace Rrep - By Department | | |
| | | Larry L. Green | 08/04/2001 10:39:06PM |
| | | | |
| Disapproved | | | |
| | Replace Brep - All Departments | | |
| | | Jack S. Blue | 08/05/2001 01:33:41PM |
| | | | |
| Draft | Rename Business Area | | |
| | | Sally M. Red | 08/06/2001 06:15:02PM |
| | | | |
| Processed | Rename Capital Plan | | |
| | | Ed Q. Orange | 08/03/2001 07:09:42PM |
| | | | |

| Status | Type | Submitter | Submitted On |
|---|---|---|---|
| | | | |
| Approved | | | |
| | Replace Brep - All Departments | | |
| | | Jack S. Blue | 08/05/2001 01:33:41PM |
| | Replace Rrep - By Department | | |
| | | Larry L. Green | 08/04/2001 10:39:06PM |
| | | | |
| Disapproved | | | |
| | Replace Brep - All Departments | | |
| | | Jack S. Blue | 08/05/2001 01:33:41PM |
| | | | |
| Draft | Rename Business Area | | |
| | | Sally M. Red | 08/06/2001 06:15:02PM |
| | | | |
| Processed | Rename Capital Plan | | |
| | | Ed Q. Orange | 08/03/2001 07:09:42PM |
| | | | |

*FIG. 1*

Replace Rrep - By Department

| Capital Plan | Capital Plan 2001 |
|---|---|
| Current Rep | Betty G. Black |
| Current Business Area | Interconnect Products |
| Future Rrep | Walter M. White |
| Future Business Area | Emerging Products |
| Departments Affected | A, C, F, H |

*FIG. 3*

USE OF AGENTS AND CONTROL DOCUMENTS TO UPDATE A DATABASE STRUCTURE

This application is a continuation application claiming priority to Ser. No. 11/248,098, filed Oct. 12, 2005; which is a divisional of U.S. Pat. No. 6,988,105, issued Jan. 17, 2006.

BACKGROUND OF THE INVENTION

1. Technical Field

The present invention relates to automated updating of a database structure by one or more agents.

2. Related Art

Software tools for updating a database typically require people to manually interact with the database, such as by submitting update statements, or other database-modifying statements, to the database management software. Such manual interaction can be very time consuming if a large number of similar or correlated database updatings need to be accomplished. Thus, there is a need for a capability for updating a database automatically without manual intervention.

SUMMARY OF THE INVENTION

The present invention provides a method for updating a database structure, comprising:

generating a dynamically changing list of control documents; and processing by a first agent a first approved control document on the list, wherein processing the first approved control document includes causing executing at least one task on the first approved control document, and wherein executing a task on the first approved control document includes updating the database structure.

The present invention provides a system for updating a database structure, comprising:

a dynamically changing list of control documents; and a first agent adapted to process a first approved control document on the list including to cause an execution of at least one task on the first approved control document, wherein an execution of a task on the first approved control document includes an updating of the database structure.

The present invention facilitates updating a database structure automatically without manual intervention.

BRIEF DESCRIPTION OF THE DRAWINGS

FIG. 1 depicts a view into a database structure, said view disclosing a list of control documents, in accordance with embodiments of the present invention.

FIG. 3 depicts tasks on an approved control document appearing on the list of FIG. 1, in accordance with embodiments of the present invention.

DETAILED DESCRIPTION OF THE INVENTION

Figure 2:
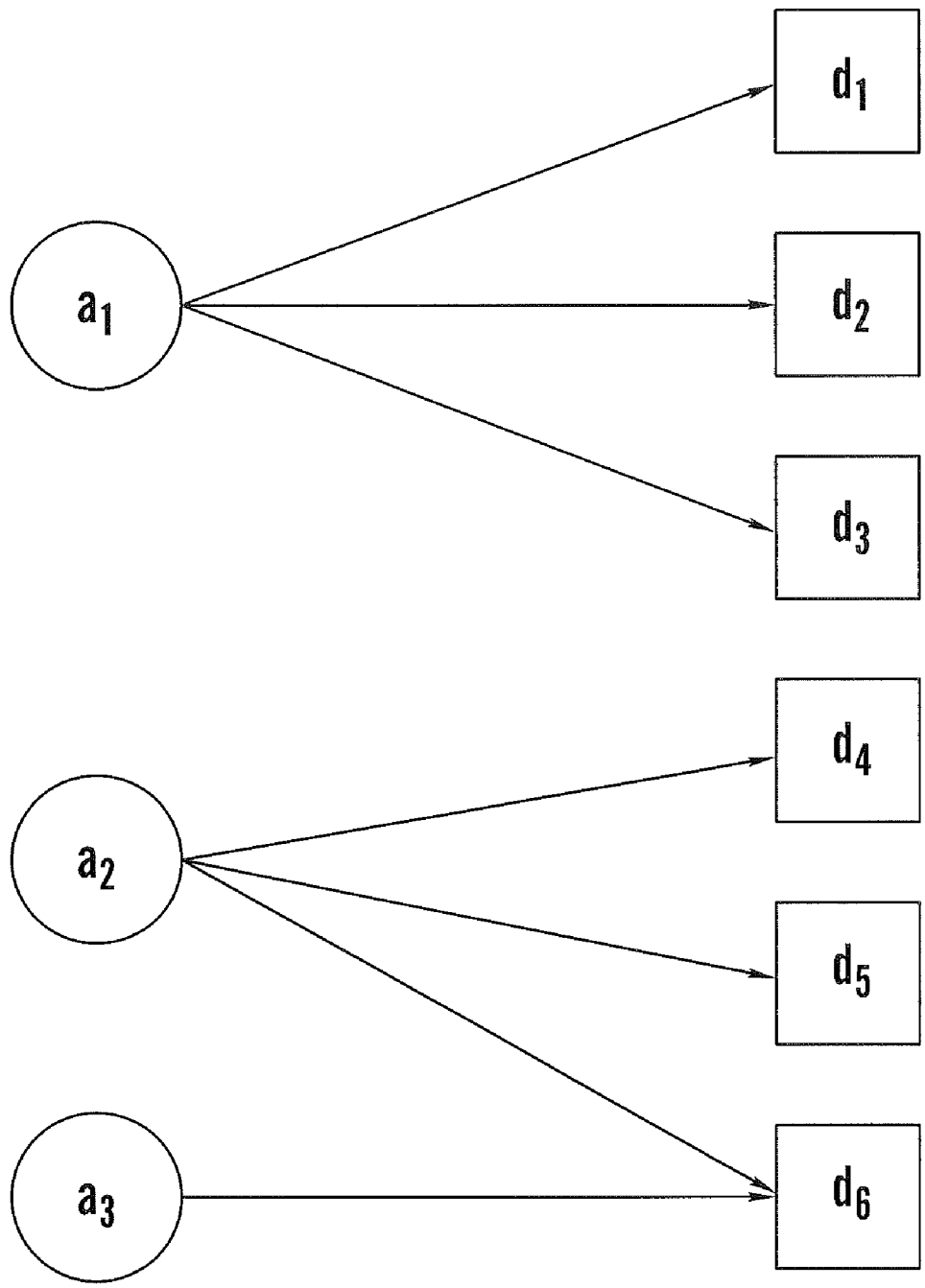
FIG. 2 depicts agents and control documents which the agents are authorized to process, in accordance with embodiments of the present invention.

FIG. 1 depicts a view into a database structure, said view disclosing a list of control documents, in accordance with embodiments of the present invention. Each entry under the "Type" column in FIG. 1 corresponds to a unique control document. Said list of control documents is dynamically changing in time. A "database structure" is defined herein as an organized group of databases, spreadsheets, tables, files, etc. capable of storing data in tabular form. The database structure exists with an operating system environment. A "view into a database structure" is known in the art as a "virtual table" in which data of the database structure is represented in the form of a table, but does not actually exist as a table of the database structure. A "control document" is a document that comprises a list of tasks to be performed by an "agent." A "task" includes updating the database structure such as by, inter alia, replacing values in the database structure with new or replacement values. A task may alternatively or additionally include updating the database structure by adding new variables or fields, and data therein, to the database structure. An "agent" is a computer executable program or software that functions as a background process within the operating system environment. The agent can function concurrent with, and independent of, other software execution that is occurring within the operating system environment. The agent can interact with other agents and can examine the database structure. The agent of the present invention serves to find "approved" control documents, and to cause the tasks in said approved control documents to be performed. An "approved" control document is a control document that has been approved for having its enumerated tasks carried out immediately or as soon as possible thereafter. As an example, the agent may be a LOTUS® script operating within a LOTUS DOMINO® software environment, and the database structure may comprise LOTUS NOTES® databases.

FIG. 1 shows four descriptors associated with each control document listed therein, namely: "Status", "Type", "Submitter", and "Submitted On". The various embodiments of "Status" shown in FIG. 1 are: "Draft" (i.e., created but not yet approved); "Approved" (i.e., tasks thereon may be carried out); "Disapproved" (i.e., tasks thereon may not be carried out); and "Processed" (i.e., tasks thereon have been carried out). As stated supra, the agents of the present invention carry out the tasks on control documents having an "Approved" status. The Status of each control document in the view of FIG. 1 is dynamically changing in time. Each entry under the "Type" column in FIG. 1 corresponds to a unique control document The "Type" descriptor identifies the type of high-level task to be carried out. A "high-level" task associated with a control document is a broad characterization of the individual tasks that are listed on the control document. For example, the Type of "Replace Brep—All Departments" in FIG. 1 denotes a high-level task in which a Brep (i.e., a Benefits Representative) in the database structure is replaced by another Brep in all Departments, where "Department" is a parameter in the database structure denoting departments of an organization to which the database structure pertains. As another example, the Type of "Replace Rrep—By Department" in FIG. 1 denotes a high-level task in which a Rrep (i.e., a Resources Representative) in the database structure is replaced by another Rrep in selected Departments, as will be further explained infra in conjunction with FIG. 3. The "Submitter" descriptor identifies a person who initially submitted the control document in "Draft" status. The "Submitted On" descriptor identifies a date and time at which the control document was initially submitted in "Draft" status.

In conjunction with FIG. 1, an agent functions as a background process that "sleeps" (i.e., is inactive) and periodically "wakes up" (i.e., becomes active). Upon awakening, the agent looks at a view of control documents, such as the view of FIG. 1, to determine if there are any approved control documents for the agent to process. The agent may have authority to process an approved control document of any "Type," or alternatively to process approved control documents of specific "Types." In the latter situation, different agents may each have authority for processing different types of control documents. Each agent in the operating system environment, upon awakening and looking at a view of control documents, selects for processing only those control documents that the agent has authority to process. FIG. 2 illustrates agents $a_1$, $a_2$, and $a_3$, and the control documents $d_1$, $d_2$, $d_3$, $d_4$, $d_5$, and $d_6$ that the agents $a_1$, $a_2$, and $a_3$ are authorized to process, in accordance with embodiments of the present invention. Some or all of the control documents $d_1$, $d_2$, $d_3$, $d_4$, $d_5$, and $d_6$ may appear in the same view of the database structure. The agent $a_1$ is authorized to process the documents $d_1$, $d_2$, and $d_3$. The agent $a_2$ is authorized to process the documents $d_4$, $d_5$, and $d_6$. The agent $a_3$ is authorized to process the documents $d_6$. FIG. 2 illustrates that two different agents may be authorized to process the same control document as illustrated by agents $a_2$ and $a_3$ each being authorized to process the same control document $d_6$.

An agent that processes a control document processes some or all of the tasks that exist on the control document, by executing tasks and/or by calling one or more other agents to execute some or all of the tasks. Inasmuch as a task comprises updating the database structure, "executing" a task comprises executing code that actually updates the database structure. Processing a task by a first agent means causes the task to be executed by the first agent or by a second agent that is directly or indirectly called by the first agent. As an example, if a first agent calls a second agent, then the first agent has directly called the second agent. As another example, if a first agent calls a second agent and the second agent calls a third agent, then the first agent has indirectly called the third agent. Generally, an agent $A_1$ indirectly calls an agent $A_M$ if agent $A_1$ calls agent $A_2$, agent $A_2$ calls agent $A_3$, ..., and agent $A_{M-1}$ calls agent $A_M$, wherein $M \geq 3$. An agent A is said to "call" an agent B if the agent A initiates execution of the software code of the agent B.

The agents are scheduled to run periodically to access a view (i.e., to look in the view for approved control documents). Alternatively, the agents may find approved control documents in other ways than through a view, such as from a search list of control documents which identifies control documents to search for and also identifies where in the database structure the control documents are located if they exist. When an agent finds an approved control document, the agent processes the control document, which includes executing at least one task on the approved control document. Executing a task on the approved control document includes updating the database structure as discussed infra in conjunction with FIG. 3.

FIG. 3 depicts tasks on the approved control document of Type "Replace Rrep—By Department" appearing on the list of control documents in FIG. 1, in accordance with embodiments of the present invention. FIG. 3 lists tasks to be executed by an agent, as well as information relating to the tasks. Rrep denotes a Resource Representative who is responsible for resources (e.g., computer equipment) for employees in various departments of an organization. As an example, such equipment may include laptop computers, workstations, printers, etc. FIG. 3 states that the Future Prep of Walter W. White in relation to the Future Business Area of Emerging Products replaces the Current Rrep of Betty C. Black in relation to the Current Business Area of Interconnect Products. In the illustration of FIG. 3, a Business Area is associated with a group of departments, and a Rrep is associated with various departments. Those departments of the business area of Interconnect Products to which Betty G. Black is associated constitute the "Affected Departments" A, C, F, and H indicated in FIG. 3. The departments of A, C, F, and H include employees. Noting that an employee database includes both a Rrep field and a Business Area field, the agent replaces Betty G. Black with Walter M. White in the Rrep field, and the agent also replaces Interconnect Products with Emerging Products in the Business Area field, for those employees in the departments of A, C, F, and H.

The Rrep of FIG. 3 is responsible for equipment, and the Capital Plan tracks such equipment. Since the tasks in FIG. 3 have effectively removed employees from the Current Prep Betty G Black to the Future Rrep Walter M. White, the agent transfers a proportionate amount of such equipment from the Current Rrep to the Future Prep. As an example, if the Current Rrep had been allocated 100 workstations for her associated employees, and if the tasks in FIG. 3 should transfer 25% of the employees under the Current Rep to the Future Rep, then 25% of the 100 workstation will likewise be transferred from the Current Rep to the Future Rep. Thus in this example, the agent will decrement 25 workstations in all fields in the database structure that denote the number of workstations assigned to the Current Rrep. Similarly, the agent will increment 25 workstations in all fields in the database structure that denote the number of workstations assigned to the Future Rrep.

The preceding tasks of FIG. 3 may all be executed by the agent G that found the approved control document of Type "Replace Rrep—By Department" appearing on the list of control documents in FIG. 1. Alternatively, the agent G may call one or more other agents to execute some or all of said tasks. In summary, FIG. 3 illustrates a control document having several tasks, each of which may be executed by the same agent or by different agents, and said task executions include updating several databases of the database structure. Generally, a given task may update one database or a plurality of databases. Thus, FIG. 3 is an example of a more general description of the present invention that is described infra in conjunction with FIG. 4.

Figure 4:
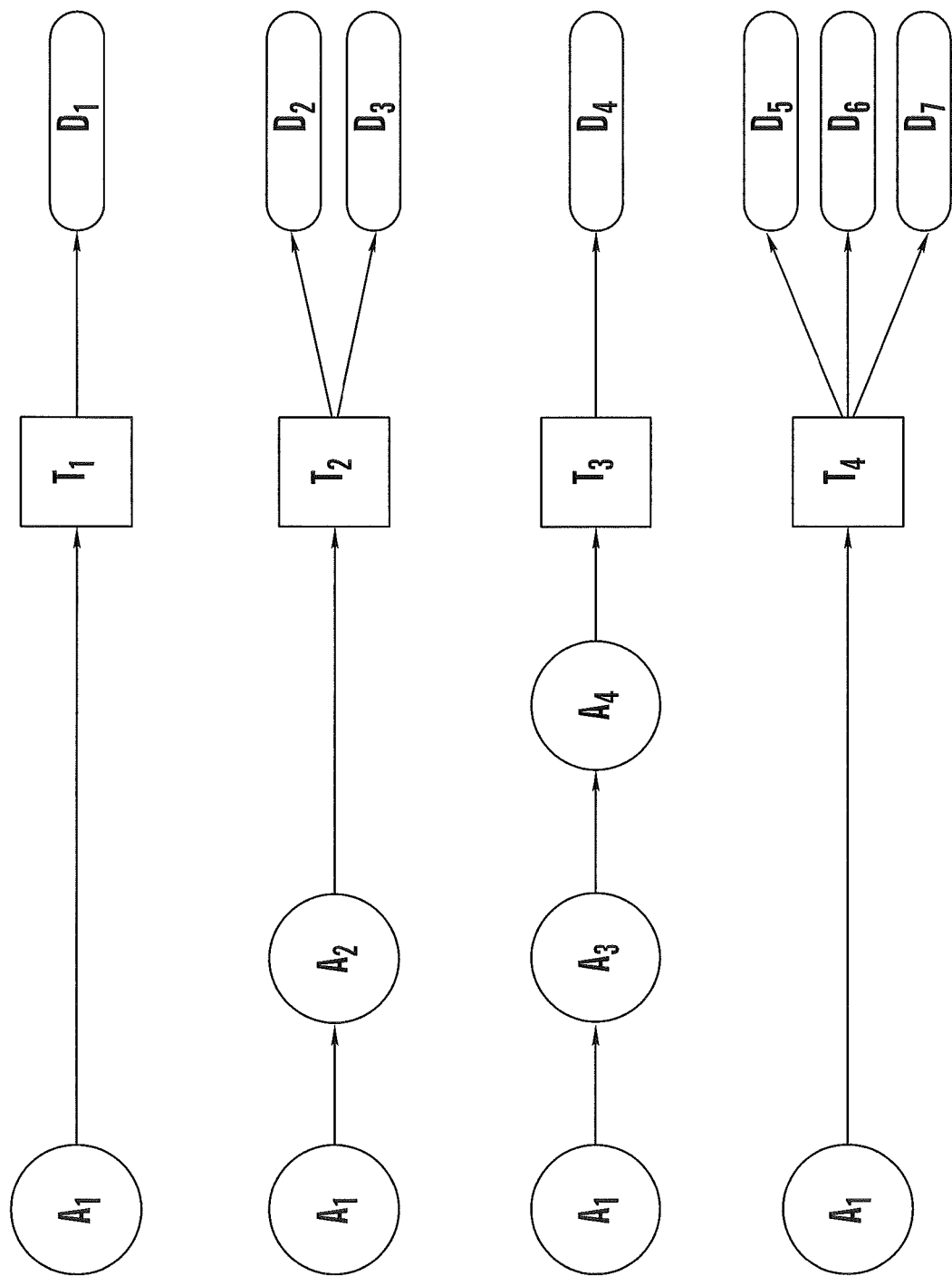
FIG. 4 depicts agents assigned to tasks of a control document and the databases updated by the tasks, in accordance with embodiments of the present invention.

FIG. 4 depicts agents $A_1$, $A_2$, $A_3$, and $A_4$ assigned to tasks $T_1$, $T_2$, $T_3$, and $T_4$ of a control document, and the databases $D_1$, $D_2$, $D_3$, $D_4$, $D_5$, $D_6$, and $D_7$ updated by the tasks $T_1$, $T_2$, $T_3$, and $T_4$, in accordance with embodiments of the present invention. Agent $A_1$, executes the task $T_1$ which updates database $D_1$. Agent $A_1$, calls agent $A_2$, and agent $A_2$ executes the task $T_2$ which updates databases $D_2$ and $D_3$, and which illustrates agent $A_1$ directly calling agent $A_2$, and which also illustrates task $T_2$ updating more than one database. Agent $A_1$ calls agent $A_2$, agent $A_2$ calls agent $A_3$, and agent $A_3$ executes the task $T_3$ which updates databases $D_4$, and which illustrates agent $A_1$ directly calling agent $A_3$ and indirectly calling agent $A_4$. Agent $A_1$ executes the task $T_4$ which updates databases $D_1$, $D_2$, and $D_3$. Note that task $T_2$ affects task $T_3$, as shown. Thus, tasks $T_2$ and $T_3$ are not independent.

Figure 5:
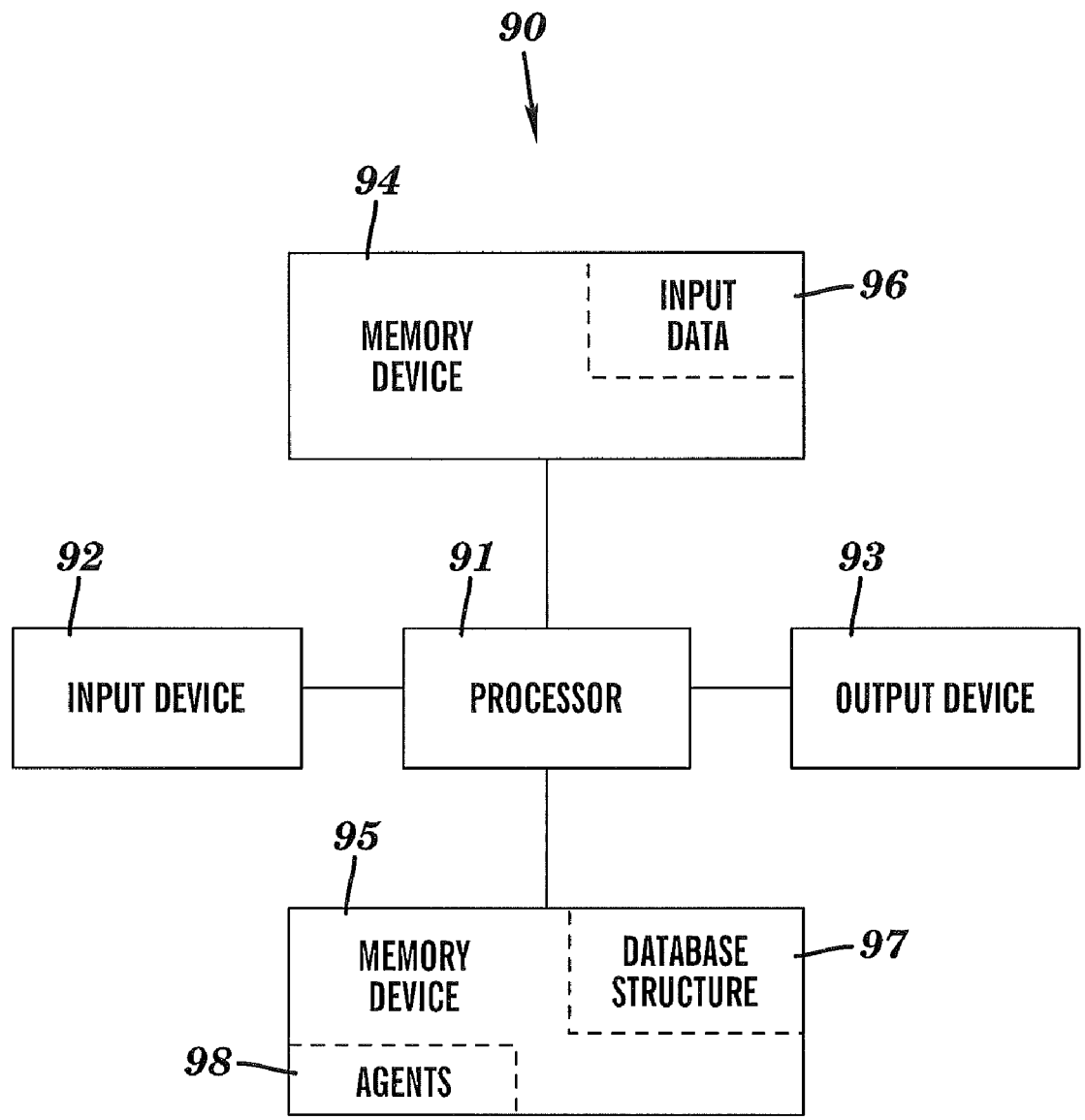
FIG. 5 depicts a computer system for storing agents and for processing control documents by agents, in accordance with embodiments of the present invention.

FIG. 5 depicts a computer system 90 for storing agents and for processing control documents by agents 98, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a dynamic random access memory (DRAM), a read-only memory (ROM), etc. The memory device 95, which is a computer usable medium, stores the agents 98 and a database structure 97. The database structure 97 includes the control documents. The processor 91 executes the agents 98. The memory device 94 includes input data 96. The input data 96 includes input required by the agents 97. The output device 93 displays output, such as views of the database structure 97, control documents, etc.

While FIG. 5 shows the computer system 90 as a particular configuration of hardware and software, any configuration of hardware and software, as would be known to a person of ordinary skill in the art, may be utilized for the purposes stated supra in conjunction with the particular computer system 90 of FIG. 5. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A system comprising a processor and a computer readable memory unit coupled to the processor, said memory unit containing software that when executed by the processor implements a method for updating a database structure, said method comprising:
   generating a view of the database structure, said view of the database structure being a table that is not a table of the database structure, said view identifying a plurality of control documents, each control document of the plurality of control documents comprising a list of tasks to be performed by at least one agent assigned to said each control document;
   processing by a first agent a first control document of the plurality of control documents in the view, wherein processing the first control document includes causing executing at least one task on the first control document, wherein the first control document has an Approved status denoting that said first control document has been approved for having the at least one task on the first control document carried out, and wherein executing a task on the first control document includes updating the database structure, wherein executing a first task of the at least one task on the first control document includes updating a plurality of databases of the database structure.

2. The system of claim 1, said method further comprising:
   accessing the view by the first agent before processing the first control document.

3. The system of claim 1, wherein executing a first task of the at least one task on the first control document includes executing the first task by the first agent.

4. The system of claim 1, wherein an executing a first task of the at least one task on the first control document includes directly calling a second agent by the first agent and an executing the first task by the second agent.

5. The system of claim 1, wherein executing a first task of the at least one task on the first control document includes indirectly calling a second agent by the first agent and executing the first task by the second agent.

6. The system of claim 1, said method further comprising processing by a second agent a second control document of the plurality of control documents in the view, wherein processing the second control document includes causing executing at least one task on the second control document, wherein the second control document has said Approved status denoting that said second control document has been approved for having the at least one task on the second control document carried out, and wherein executing a task on the second control document includes updating the database structure.

7. The system of claim 1, wherein an executing a first task of the at least one task on the first control document includes updating a first database of the database structure, and wherein an executing a second task of the at least one task on the first control document includes updating a second database of the database structure.

8. The system of claim 1, wherein a first task and a second task of the at least one task on the first control document are not independent.

9. The system of claim 1, wherein an executing a first task of the at least one task on the first control document includes replacing a name of a first person with a name of a second person in a plurality of databases of the database structure.

10. The system of claim 1, wherein a second control document of the plurality of control documents has a Disapproved status denoting that the tasks on the list of tasks comprised by the second control document cannot be carried out.

11. The system of claim 1, wherein a second control document of the plurality of control documents has a Draft status denoting that the tasks on the list of tasks comprised by the second control document have been created but have not yet been approved for being carried out.

12. The system of claim 1, wherein a second control document of the plurality of control documents has a Processed status denoting that the tasks on the list of tasks comprised by the second control document have been carried out.

13. The method of claim 1, wherein said generating the view comprises:
   organizing the view into columns that include a Type column and a Status column, said entries in the Type column each identifying a unique control document of the plurality of control document;
   said entries in the Status column each being associated with a corresponding entry of a control document identified in the Type column;
   each entry in the Status column for said associated control document identified in the Type column having a status selected from the group consisting of the Approved status, a Disapproved status, a Draft status, and a Processed status;
   said Disapproved status for said associated control document identified in the Type column denoting that said associated control document cannot have its tasks carried out;
   said Draft status for said associated control document identified in the Type column denoting that said associated control document has been created but has not yet been approved for having its tasks carried out;
   said Processed status for said associated control document identified in the Type column denoting that said associated control document has had its tasks carried out.

14. A computer program product, comprising a computer usable storage medium having a computer readable program code stored therein, said computer readable program code containing instructions that when executed by a processor of a computer system implement a method for updating a database structure, said method comprising:
   generating a view of the database structure, said view of the database structure being a table that is not a table of the database structure, said view identifying a plurality of control documents, each control document of the plurality of control documents comprising a list of tasks to be performed by at least one agent assigned to said each control document;

processing by a first agent a first control document of the plurality of control documents in the view, wherein processing the first control document includes causing executing at least one task on the first control document, wherein the first control document has an Approved status denoting that said first control document has been approved for having the at least one task on the first control document carried out, and wherein executing a task on the first control document includes updating the database structure, wherein executing a first task of the at least one task on the first control document includes updating a plurality of databases of the database structure.

15. The computer program product of claim 14, wherein executing a first task of the at least one task on the first control document includes replacing a name of a first person with a name of a second person in a plurality of databases of the database structure.

16. The computer program product of claim 14, wherein a second control document of the plurality of control documents has a Disapproved status denoting that the tasks on the list of tasks comprised by the second control document cannot be carried out.

17. The computer program product of claim 14, wherein a second control document of the plurality of control documents has a Draft status denoting that the tasks on the list of tasks comprised by the second control document have been created but have not yet been approved for being carried out.

18. The computer program product of claim 14, wherein a second control document of the plurality of control documents has a Processed status denoting that the tasks on the list of tasks comprised by the second control document have been carried out.

19. The computer program product of claim 14, wherein said generating the view comprises:

organizing the view into columns that include a Type column and a Status column, said entries in the Type column each identifying a unique control document of the plurality of control document;

said entries in the Status column each being associated with a corresponding entry of a control document identified in the Type column;

each entry in the Status column for said associated control document identified in the Type column having a status selected from the group consisting of the Approved status, a Disapproved status, a Draft status, and a Processed status;

said Disapproved status for said associated control document identified in the Type column denoting that said associated control document cannot have its tasks carried out;

said Draft status for said associated control document identified in the Type column denoting that said associated control document has been created but has not yet been approved for having its tasks carried out;

said Processed status for said associated control document identified in the Type column denoting that said associated control document has had its tasks carried out.

* * * * *